Nov. 22, 1938.    E. P. DORMAN    2,137,714
MOLD ADJUSTING MEANS FOR GLASS SHAPING MACHINES
Filed Jan. 30, 1935    2 Sheets-Sheet 2

INVENTOR
Edgar Philip Dorman
BY
ATTORNEY

Patented Nov. 22, 1938

2,137,714

UNITED STATES PATENT OFFICE 2,137,714

MOLD ADJUSTING MEANS FOR GLASS SHAPING MACHINES

Edgar Philip Dorman, London, England, assignor, by mesne assignments, to Ball Brothers Company, Muncie, Ind., a corporation of Indiana Application January 30, 1935, Serial No. 4,175
In Great Britain December 18, 1934

12 Claims. (Cl. 49—41)

This invention relates to glass shaping machines and has particular reference to the mold elements used thereon and to the adjusting means employed in connection with such mold elements.

As is well known, in glass shaping machines such as are employed for manufacturing bottles and other glass containers, a plurality of mold elements are usually suitably mounted in position upon a carrier or framework which is adapted to be rotated continuously around the central vertical axis of the machine whilst the various steps of the molding operations are effected in synchronized succession. In such machines, it is usually essential that some means should be provided by which the positions of the mold elements relatively to their carrier can be adjusted. For instance, in cases where the neck portion and the body portion of a bottle, jar or other such container are shaped or formed in two separate but co-operating mold elements (i. e. a neck mold and a body blow or finishing mold) which are independently supported in or by different parts of the machine, it is important that the two mold elements should be capable of being accurately adjusted one with the other so that, at the junction of the mold elements, no unsightly joint or mold line will appear on the finished bottle or other form of glassware being produced.

Various means for effecting such adjustments have been proposed and tried in practice but many have proved deficient in some respect or other. For instance, some have been inconveniently located and difficult and cumbersome to adjust which is a distinct drawback in the case of high speed multi-head machines where adjustments have to be made whilst the machine is in operation, whilst others, although partially successful in operation, have been found too expensive owing to the nature of the mechanism involved.

The chief object of the present invention is to overcome these drawbacks by providing a simple and efficient means for effecting the necessary mold adjustments, said means being such so arranged so that they are readily accessible from the outside or peripheral portion of the machine.

The invention is particularly, although not exclusively, applicable to that type of machine in which the finishing mold is made in two parts or halves hinged around a vertical pin, said pin being supported in a plate-like member which serves as a support for the mold so that the latter can slide thereon in opening and closing, and which may also serve as a support for the bottom plate of the mold.

According to one feature of the invention an improved means for effecting lateral and other adjustments of the molds is provided comprising a pivotally mounted member, such as a bell crank lever, located inwardly of the peripheral portion of the machine and adjacent the rear portion of a mold, the said member or lever being interconnected both with the mold, for example, through its hinge pin, and with an actuating member extending outwardly to a convenient position at the outside or peripheral portion of the machine. The said actuating member is preferably constituted by a spindle formed adjacent its ends with screw threaded portions one of which is adapted to co-operate with a nut or the like carried by a part of the pivotally mounted member or lever whilst the other co-operates with another nut or the like carried by a part of the mold support or carrier, the said screw-threads being of opposite hands so that, by rotating the spindle about its longitudinal axis, the nut carried by the pivotally mounted member or lever can be caused to approach or recede from the other nut so as to effect an angular movement of said member or lever.

According to another feature of the invention an improved mold adjusting means is provided by which the mold is capable of being moved (a) in a radial direction with respect to the centre of the machine (b) laterally or circumferentially with respect to the centre of the machine and (c) around the vertical axis of the mold, the arrangement being such that all of such adjustments can be effected through means readily accessible at the outside or outer peripheral portion of the machine.

In order that the said invention may be clearly understood and readily carried into effect, the same will now be more fully described with reference to the accompanying drawings in which:—

Figure 1:
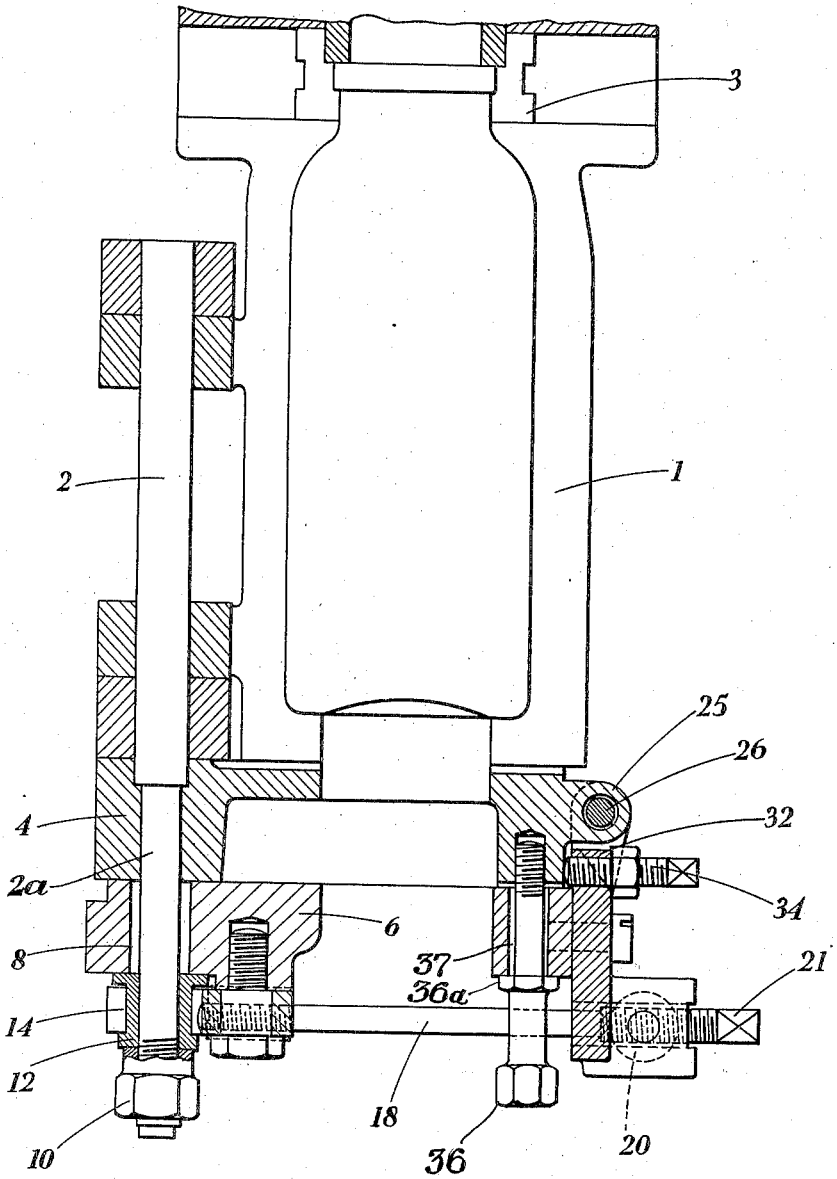
Fig. 1 is a vertical sectional view through a finishing mold and a portion of its support or carrier incorporating a mold adjusting means embodying the invention.
Figure 2:
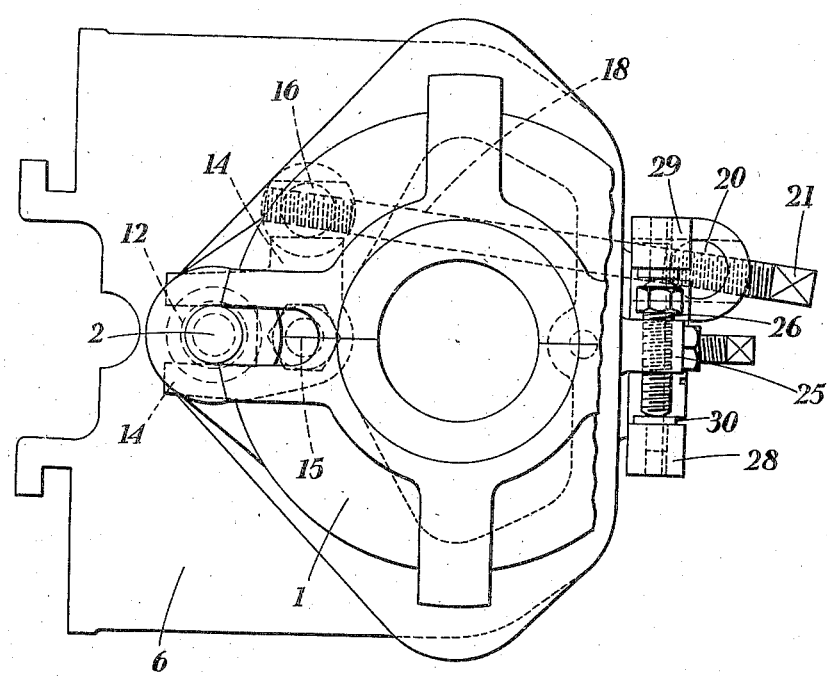
Fig. 2 is a plan view of the arrangement shown in Fig. 1.
Figure 4:
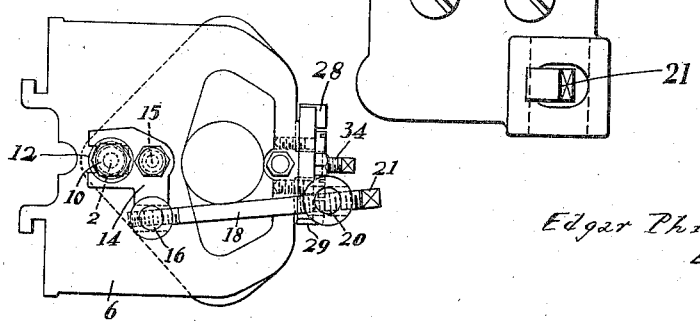
Fig. 4 is a side view of a part of the mold support shown in Fig. 1.
Figure 3:
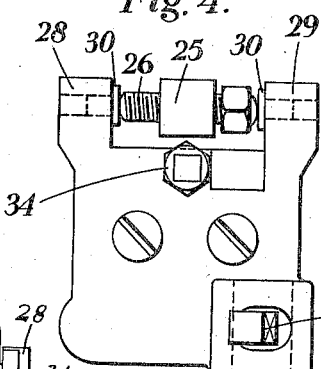
Fig. 3 is an underneath plan view of the arrangement shown in Figs. 1 and 2.

In the embodiment of the invention illustrated, 1 indicates a body blow or finishing mold which is, as usual, made up of two hingedly connected mold parts movable relatively to each other for mold opening and closing purposes upon a hinge pin 2, and 3 indicates a neck mold which is adapted to co-operate with the finishing mold. As is usual, the hinge pin 2 is located inwardly of the outer peripheral portion of the machine and the molds are arranged so that, in their closed positions, the meeting faces of the mold parts are disposed substantially radially of the machine.

4 indicates a plate-like member upon which the finishing mold parts can slide in opening and closing and which also serves as a support both for the mold parts and the hinge pin and also, in some instances, for a bottom plate used in conjunction with the finishing mold. The said plate-like member is, in turn, suitably supported in position upon a part 6 of the rotary carrier or framework of the machine, and the hinge pin 2 is provided with a reduced lower end 2a which extends downwardly through an opening 8 in the part 6 and which is sufficiently large relatively to the diameter of the hinge pin extension 2a, to permit it to be displaced laterally therein. At its lower end the hinge pin extension 2a is formed with a screw-threaded portion provided with a nut 10 by which the hinge pin 2 and its associated elements can be clamped in position after adjustment.

Surrounding the lower end of the hinge pin extension 2a so that it is disposed between the nut 10 and the lower face of the part 6, is a sleeve or thimble 12 embraced by a pair of jaws formed upon one arm of a bell crank lever 14 which is pivotally mounted at 15 upon the part 6. The other arm of the bell crank lever carries a nut 16 threaded to receive a screw formed upon one end of an actuating spindle 18 the opposite end of which is threaded into a similar nut 20 carried in a suitable part of the part 6 at or near the peripheral portion of the machine. The threads upon opposite ends of the spindle 18 and those in the nuts 16 and 20 respectively are of opposite hands so that, when the spindle is rotated about its longitudinal axis in one direction, the nut 16 will be drawn towards the nut 20 and, when the spindle is rotated in the opposite direction, the nut 16 will be moved away from the nut 20. In order to facilitate the rotation of the spindle the protruding end thereof is preferably squared as indicated at 21 or otherwise shaped to enable a spanner, handwheel or the like to be slipped thereon. From the foregoing it will be appreciated that, by rotating the spindle 18 in the appropriate direction, the hinge pin extension 2a can be moved laterally in the enlarged opening 8 and the pin 2 and the rear parts of the mold elements carried thereby adjusted laterally, in one direction or the other, in a simple and convenient manner from the outside of the machine and, if necessary, without interrupting the operation of the machine.

At its front end the plate-like member 4 is also preferably formed with a lug or other projection 25 threaded to receive a screw 26 which is passed through the lug and is fitted in position so that its ends bear against the opposed faces of a pair of lugs or projections 28 and 29 on the part 6 of the carrier or framework or against wearing pieces 30 provided on such lugs or projections. Thus, the screw 26 cannot itself move endwise and, when rotated, will cause the lug 25 to move therealong in one direction or the other according to the direction in which the screw is rotated, thereby enabling lateral adjustments of the front portions of the molds to be readily effected.

Into or through a further lug or projection 32 provided on the front or peripheral portion of the mold carrier, there is preferably threaded another screw 34 arranged in such position that the inner end thereof bears against the front of the plate-like member 4. Thus, by an appropriate rotation of the latter screw, the plate-like member and the mold elements carried thereby can be pushed towards the centre of the machine or the screw can be slackened back to permit the plate-like member and the mold elements to move outwardly away from the centre of the machine. In this connection it will be appreciated that no positive means for moving the molds in the last mentioned direction are necessary since the tendency of the molds, in the rotary types of machines under consideration, will always be to take up a position as far from the centre of the machine as is permitted by the screw 34. It will also be appreciated that, when the molds are moved radially of the machine, the thimble or sleeve 12 will slide within the jaws of the bell crank lever 14.

After the front portion of the mold has been adjusted, either through the manipulation of the screw 26 or the screw 34, or both, the front portion of the mold is then locked in such adjusted position by bolt 36, which extends through an enlarged opening 37 in the part 6 of the carrier or framework of the machine and is threaded into the plate-like member 4. Bolt 36 has a collar 36a thereon which, when the bolt is tightened, engages the part 6 and clamps the plate-like member 4 to part 6. When the front portion of the mold is to be adjusted, the bolt 36 is backed up or loosened, after which the desired adjusting screw 26—34 is operated to shift the front end of the mold laterally and/or radially, and since the opening 37 is larger than the diameter of the bolt 36, such adjustment may be made readily without the complete removal of the clamping bolt 36.

The various mold adjusting means above described may be used individually or their actions may be coordinated for the effecting of various mold displacements or adjustments. For instance, if it is desired to move the mold bodily in a lateral direction, the spindle 18 may first be rotated in the appropriate direction to cause the bell crank lever 14 to swing the hinge pin 2 and the rear portion of the mold carried by said pin in the desired direction, the plate-like member 4 pivoting during this movement about the points at which the screw 26 bears against the lugs 28 and 29, and then the screw 26 may be brought into operation to swing the plate-like member 4 about the hinge pin 2 so as to cause the front portion of the plate-like member and of the mold carried thereby in the same lateral direction. Also, it will be apparent that the mold may be adjusted angularly about its own axis, by operating the spindle 18 to cause the rear part of the mold to move in one lateral direction and by operating the screw 26 to cause the front part of the mold to move in the opposite lateral direction. Various other combinations of movements will also be apparent to those skilled in the art.

Having thus described my invention what I claim as new therein and desire to secure by Letters Patent is:—

1. The combination in a glass shaping machine comprising a mold carrier having an enlarged opening therein, a hinge pin extending through the opening in said carrier, a two-part mold pivoted at the rear to said hinge pin and supported on said carrier, means for laterally displacing said hinge pin relative to said carrier, means for laterally displacing the front end of said mold relative to said carrier, and means for displacing said mold longitudinally of said carrier.

2. The combination in a glass shaping machine comprising a mold supporting carrier having an enlarged opening therein, a mold supported on said carrier, a hinge pin for said mold extending through the opening in said carrier and means for moving said mold laterally relative to said carrier including a bell crank lever pivoted to said carrier and connected with said mold and an actuating member for turning said bell crank.

3. The combination in a glass shaping machine comprising a mold supporting carrier, a mold supported in position upon said carrier, a hinge pin for said mold projecting through an enlarged opening in said carrier, a bell crank lever pivoted to said carrier and having one arm connected to said hinge pin, a screw threaded spindle coupled to the other arm of said lever and extending outwardly beyond the front portion of said carrier, and means on said carrier for adjustably holding the outer end of said spindle in position.

4. The combination in a glass shaping machine comprising a mold carrier, a mold supported on said carrier, a hinge pin for said mold projecting through an opening in said carrier, a bell crank lever pivoted to said carrier and having one end connected to said hinge pin and a lever actuating spindle having its ends provided with oppositely disposed threads threaded to said lever and said carrier.

5. The combination in a glass shaping machine comprising a mold carrier, a two-part mold supported on said carrier, the parts of which are movable relative to said carrier, a hinge pin extending through an opening in said carrier and on which the parts of said mold are journaled, and means for laterally displacing said hinge pin relative to said carrier.

6. The combination in a glass shaping machine comprising a mold carrier, a plate member supported by said mold carrier, a hinge pin supported by said plate member and extending through an opening in said carrier, a two-part mold pivoted upon said hinge pin, and means for displacing said hinge pin to move said mold laterally relative to said carrier, and means for laterally displacing said plate member independently of said first-mentioned means.

7. The combination in a glass shaping machine comprising a mold carrier, a plate member supported by said carrier, a hinge pin supporting said plate member and extending through an opening in said carrier, a two-part mold pivotally mounted on said hinge pin, a bell crank lever pivoted to said carrier and having one arm connected to said hinge pin, and means associated with the other arm of said bell crank lever for turning said bell crank and moving said hinge pin.

8. The combination in a glass shaping machine comprising a mold carrier, a plate member supported by said carrier, a two-part mold supported on said plate member, means for moving the rear end of said plate laterally relative to said carrier, and independently actuated means for moving the front end of the plate laterally relative to said carrier.

9. The combination in a glass shaping machine comprising a mold carrier, a plate member supported by said mold carrier, a hinge pin supported by said plate member and extending through an opening in said carrier, a two-part mold hinged upon said hinge pin, a pair of spaced lugs on said carrier, a projection on the front of the plate-like member extending outwardly between the lugs on said carrier, and a screw threaded through said projection and having its ends abutting against the lugs on said carrier.

10. The combination in a glass shaping machine comprising a mold carrier, a plate member supported by said mold carrier, a hinge pin supported by said plate member and extending through an opening in said carrier, a two-part mold pivoted upon said hinge pin, a bell crank pivoted to said carrier and having one arm connected to said hinge pin, means associated with the other arm of said bell crank for turning the same and moving said hinge pin, a pair of spaced lugs on the front of said carrier, a projection on said plate member extending between said lugs, and a screw threaded through said projection having its ends abutting against said spaced lugs.

11. The combination in a glass shaping machine comprising a mold carrier, a plate member supported by said mold carrier, a hinge pin supported by said plate member and extending through an opening in said carrier, a two-part mold pivoted upon said hinge pin, a bell crank pivoted to said carrier and having one arm connected to said hinge pin, means for turning said bell crank to shift said hinge pin laterally, a pair of spaced lugs on said carrier, a projection on the front of said plate member extending outwardly between said lugs, a screw threaded through said projection and having its ends abutting against said lugs, a projection on the front of said carrier and a screw threaded through said projection and bearing against the front of said plate member.

12. The combination in a glass shaping machine comprising a mold carrier, a plate member supported by said carrier, a two-part mold carried by said plate member, a hinge pin upon which the two parts of the mold are pivoted, means for laterally displacing the front portion of the plate member, and means for laterally displacing the rear portion of the plate member including a bell crank lever connected to said hinge pin and a screw threaded spindle connected to said bell crank.

EDGAR PHILIP DORMAN.